United States Patent
Backs et al.

(10) Patent No.: US 7,335,866 B2
(45) Date of Patent: Feb. 26, 2008

(54) METHOD FOR IMPROVING DEPTH DISCRIMINATION IN OPTICAL REPRODUCTION SYSTEMS

(75) Inventors: Bernhard Backs, Eching (DE); Joerg Schaffer, Goettingen (DE); Lutz Schaefer, Ontario (CA); Martin Voelcker, Goettingen (DE)

(73) Assignee: Carl Zeiss MicroImaging GmbH, Jena (DE)

(*) Notice: Subject to any disclaimer, the term of this patent is extended or adjusted under 35 U.S.C. 154(b) by 180 days.

(21) Appl. No.: 10/533,067

(22) PCT Filed: Oct. 28, 2003

(86) PCT No.: PCT/EP03/11927

§ 371 (c)(1),
(2), (4) Date: Feb. 6, 2006

(87) PCT Pub. No.: WO2004/038483

PCT Pub. Date: May 6, 2004

(65) Prior Publication Data

US 2006/0186311 A1   Aug. 24, 2006

(30) Foreign Application Priority Data

Oct. 28, 2002  (DE) .............................. 102 50 568

(51) Int. Cl.
*G02B 27/40* (2006.01)
*G03B 21/26* (2006.01)

(52) U.S. Cl. ..................... 250/201.3; 353/30
(58) Field of Classification Search .......... 250/201.3; 353/30

See application file for complete search history.

(56) References Cited

U.S. PATENT DOCUMENTS

| 5,034,613 | A  | * | 7/1991  | Denk et al. ......... 250/458.1 |
| 2001/0043495 | A1 | * | 11/2001 | Kumacheva et al. ..... 365/200 |
| 2003/0086067 | A1 | * | 5/2003  | Gerstner et al. ....... 353/30 |
| 2003/0235136 | A1 | * | 12/2003 | Akselrod et al. ...... 369/108 |

FOREIGN PATENT DOCUMENTS

| DE | 199 30 816 | 1/2001 |
| DE | 101 18 463 | 10/2002 |
| EP | 1 235 424  | 8/2001 |
| WO | 97/06509   | 2/1997 |
| WO | 97/45745   | 10/1998 |
| WO | 02/12945   | 2/2002 |

OTHER PUBLICATIONS

XP-000822234 Applied Spectroscopy, vol. 53, No. 1, 1999, 10 pages "Spectral Imaging in a Programmable Array Microscope by Hadamard Transform Fluorescence Spectroscopy" Quentin S. Hanley, et al.

\* cited by examiner

*Primary Examiner*—Georgia Epps
*Assistant Examiner*—Kevin Wyatt
(74) *Attorney, Agent, or Firm*—Reed Smith LLP

(57) ABSTRACT

The invention is directed to a method for improving the depth discrimination in optically imaging systems. It is applicable in particular in light microscopy for improving image quality when examining three-dimensionally extending objects. It is applicable in the method of structured illumination as described in WO 97/6509. For this purpose, influences due to variations in the brightness of the light source, positioning of the imaged periodic structure and bleaching of the object in fluorescence illumination are determined and taken into account in the calculation of the object structure.

13 Claims, 3 Drawing Sheets

METHOD FOR IMPROVING DEPTH DISCRIMINATION IN OPTICAL REPRODUCTION SYSTEMS

CROSS-REFERENCE TO RELATED APPLICATIONS

This application claims priority of International Application No. PCT/EP2003/11927, filed Oct. 28, 2003 and German Application No. 102 50 568.3, filed Oct. 28, 2002, the complete disclosures of which are hereby incorporated by reference.

BACKGROUND OF THE INVENTION a) Field of the Invention

The invention is directed to a method for depth discrimination in optically imaging systems. In particular, it is applicable in light microscopy for achieving an improvement in image quality in the examination of three-dimensionally extending objects.

b) Description of the Related Art

A problem arising in conventional light microscopy when examining three-dimensionally extending objects, i.e., objects whose extension along the optical axis is greater than the depth of focus of the objectives that are used, consists in that the in-focus image from the region of focus is superposed with extra-focal image components which are accordingly imaged out of focus.

In order to overcome this problem, it is known to use confocal imaging in which the light originating from the area outside the region of focus is excluded by means of a pinhole and therefore does not contribute to the image. In this way, an optical section is formed. This confocal point-type imaging requires that the object is scanned in the image plane in order to obtain an image. This scanning can be carried out either by means of scanners in laser scanning microscopes or by means of Nipkow disks.

By recording a plurality of optical section images in different focus positions, a z-stack can be obtained so that the object may be displayed three-dimensionally.

Another method for generating optical sections is to use structured illumination. This was first stated by Meir Ben-Levy and Eyal Pelac in WO 97/6509. This method was improved and expanded as described by Tony Wilson et al. in WO 98/45745 and by Volker Gerstner et al. in WO 02/12945. The disclosure of these three publications is expressly referenced herein.

In WO 97/6509, the object is illuminated by a periodic structure (sine grating or rectangular grating) and an image of the object is recorded by a camera, digitized and stored in a storage. The periodic structure is subsequently displaced within the image plane in such a way that the phase position of the structure is changed and an image is again recorded and stored. This process (displacement, image recording, storage) can be repeated many times. A section image is then generated by calculating from the existing images. The indicated mathematical formulation is a Fourier expansion, which leads to a complicated formula apparatus.

WO 98/45745 shows a simpler formula for the section images which can be derived by simplifying the formula from WO 97/6509 in case of equal phase displacements between the individual recordings.

Realizing the physical boundary conditions required for the application of the indicated method proves very difficult in practice. For example, variation in lamp brightness between the different recordings leads to stripe artifacts in the generated section images. With fluorescing objects, additional problems occur due to the time-dependent fading of the fluorescent dyes, which likewise results in errors. The necessary constancy of the individual phase displacement steps cannot be maintained in practice.

Therefore, it was suggested in WO 02/12945 to compensate for the influence of lamp brightness that varies over time by coupling out part of the light serving to illuminate the object, registering the intensity and subsequently scaling the individual recordings. In order to take into account unequal phase displacement steps, a system of equations (Equation 22, op. cit.) is indicated. To compensate for fading or bleaching, instead of the necessary minimum of three recordings per section image, it is suggested that six recordings are registered in the sequence 1-2-3-3-2-1, two section images are calculated (from 1-2-3 and 3-2-1) and the average is determined therefrom.

A considerable expenditure on instrumentation is required in order to realize these suggestions. Further, the recording of additional images prolongs the required recording time and therefore also increases aging of the sample by illumination with the fluorescence excitation light.

OBJECT AND SUMMARY OF THE INVENTION

It is the primary object of the invention to overcome the disadvantages of the prior art and to provide an improved method for determining optical section images. This object is met by a method for improving the depth discrimination of optically imaging systems comprising the steps of a) illuminating an object with a periodic structure, b) registering the resulting brightness distribution, c) creating displacement of the phase position of the periodic structure, d) repeating steps a) to c) until at least three brightness distributions have been registered, e) calculating the registered brightness distributions to obtain an object brightness distribution, f) registering the displacement of the phase positions from c), detecting brightness variations of the illumination, h) determining bleaching phenomena of the object in fluorescence illumination, and carrying out calculation taking into account the results obtained in steps f) to h).

The invention will be described more fully in the following with reference to the drawings.

DESCRIPTION OF THE PREFERRED EMBODIMENTS

Figure 1:
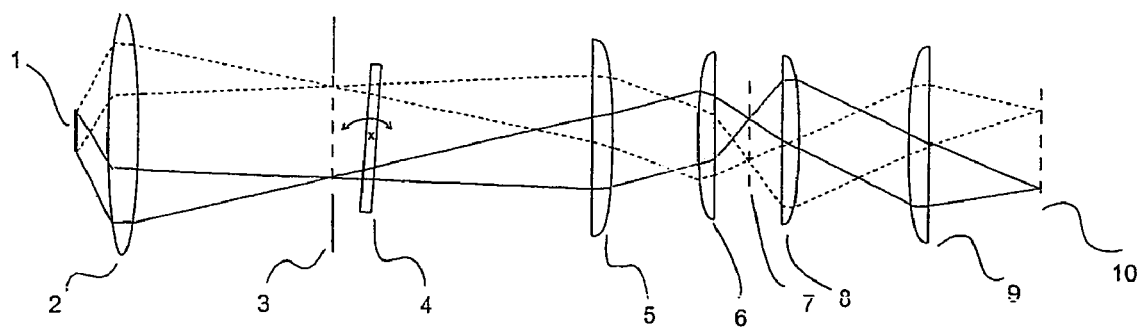
FIG. 1 shows the basic construction of a microscope with structured illumination.

FIG. 1 is a simplified optical schematic illustrating the structured illumination with transmitted illumination by way of example. The imaging beam path (image-forming beam path) is shown. A one-dimensional periodic structure (transmission grating) (3) which is located in a conjugated object plane of the optical arrangement shown in the drawing is illuminated by a light source (1) through collector optics (2). The grating is followed in light direction by a plane-parallel glass plate (4). The angle of the plane-parallel plate relative to the optical axis can be adjusted in a defined manner. The structure is imaged in the specimen plane (7) by the illumination-side optics (5, 6) (condenser). Imaging is effected by the light coming from the specimen through a pair of lenses (8, 9) (objective and tube lens) in the image plane (10) following the latter in which, e.g., a CCD matrix of a digital camera can be arranged. By tilting it in a defined manner, the plane-parallel glass plate (4) serves to displace the image of the grating structure (3) on the object in the specimen plane (7). For incident light fluorescence observation, the objective (8) serves at the same time as a condenser. As was described in WO 02/12945, the resulting brightness distribution in the object is registered in at least 3 positions of the glass plate (4) by means of the digital camera. In this connection, the brightness distribution $I_i$ (x, y) for a sine/cosine grating can be stated in a simplified manner by the following formula:

$$I_i(x, y) = I_0(x, y) \cdot (1 + m(x, y) \cdot \cos(\phi_0(x, y) + \phi_i(x, y)),  \quad (1)$$

where i=0 ... N−1 is the ith phase position of the projected grating, and N is the number of recordings, m(x, y) is the modulation depth of the object (and therefore the image information sought at point x, y), and $\phi_i$ are the phase values. This equation contains the three unknown variables $I_0$, m and $\phi_0$. Accordingly, these variables can be determined by means of at least three measurements with specifically varied $\phi_i$(i=1, 2, 3). The solution can be found from the measurements through a least square formulation. For this purpose, it is possible to represent Equation (1) in a more compact form and to rewrite the cosine function using the addition theorem:

$$I(x, y, \phi_i) = a_0(x, y) + a_1(x, y) \cdot f_1(\phi_i) + a_2(x, y) \cdot f_2(\phi_i), \quad (2)$$

where $$f_1(\phi_i) = \cos \phi_i$$

$$f_1(\phi_i) = \sin \phi_i$$

$$a_0(x, y) = I_0(x, y)$$

$$a_1(x, y) = I_0(x, y) \cdot m(x, y) \cdot \cos \phi_0(x, y)$$

$$a_2(x, y) = -I_0(x, y) \cdot m(x, y) \cdot \sin \phi_0(x, y)$$

The functions $f_1$ and $f_2$ therefore depend only on the phase displacements $\phi_i$, which can be freely selected in principle. For a structure that is not sinusoidal but is periodic, the brightness distribution $I_i$ (x, y) can also be approximated by series expansion. The principle of calculation remains basically the same. Expressed in matrix form, the least square solution is:

$$\hat{M} \cdot \vec{a} = \vec{b}, \quad (3)$$

where $$\hat{M} = \begin{pmatrix} N & \sum_N f_1(\phi_i) & \sum_N f_2(\phi_i) \\ \sum_N f_1(\phi_i) & \sum_N f_1^2(\phi_i) & \sum_N f_1(\phi_i) f_2(\phi_i) \\ \sum_N f_2(\phi_i) & \sum_N f_1(\phi_i) f_2(\phi_i) & \sum_N f_2^2(\phi_i) \end{pmatrix}, \quad (4)$$

where N is the number of measurements (in this case, phase steps) and $$\vec{a} = \begin{pmatrix} a_0(x, y) \\ a_1(x, y) \\ a_2(x, y) \end{pmatrix} \quad (5)$$

and $$\vec{b} = \begin{pmatrix} \sum_N I(x, y, \phi_i) \\ \sum_N [I(x, y, \phi_i) \cdot f_1(\phi_i)] \\ \sum_N [I(x, y, \phi_i) \cdot f_2(\phi_i)] \end{pmatrix}$$

structure (3) are designated by (12), the zero point is designated by (13) and corresponds to the DC component of the illumination, i.e., a uniform, unstructured illumination.

The solution to this matrix equation is obtained mathematically by inverting the matrix M.

$$\begin{pmatrix} a_0(x, y) \\ a_1(x, y) \\ a_2(x, y) \end{pmatrix} = \hat{M}^{-1} \cdot \vec{b} \quad (7)$$

Accordingly, the unknown variables being sought can be determined from the measurements, represented by vector b, and the phase displacements of the grating. In particular, the modulation depth at point (x, y) is given by:

$$m(x, y) = \frac{\sqrt{a_1^2(x, y) + a_2^2(x, y)}}{a_0(x, y)} \quad (8)$$

Since the grating contrast and, therefore, by necessity, the modulation depth in the object decreases with defocusing of the object, Equation (8) is a conditional equation for obtaining a depth-discriminated image (optical section). Equations (2) and (3) provide a universal approach that allows the phase positions $\phi_i$ to be adapted to the actual conditions. Accordingly, the number of steps and the positions in the object space (location of the imaged grating lines) can be freely selected.

Each optical system, according to its optical transfer function, transfers spatial frequencies up to a threshold value that is determined by the numerical aperture NA of the optics and the light wavelength λ:

$$k_{max} = \frac{4\pi NA}{\lambda}$$

Figure 2:
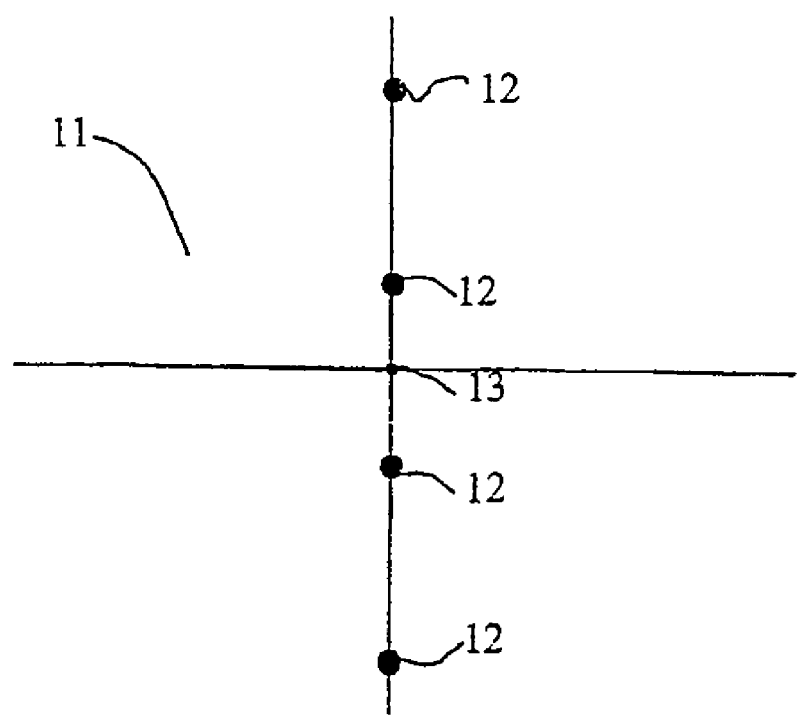
FIG. 2 is a schematic view of the bandpass filter, according to the invention, in the Fourier plane.

As a result, the higher harmonics of the grating period of a grating which is imaged in the object space and which is not a pure sine grating are transmitted up to this threshold frequency $k_{max}$ and are found in the Fourier-transformed image of the object as local maxima. These components of the grating are also contained in a section image determined according to the plan detailed above and result in stripe artifacts. These artifacts can be eliminated in that the harmonics of the projected grating are localized in the spatial frequency spectrum by Fourier transformation and are removed by a specific setting of filters (bandpass filters, bandstops). A subsequent inverse transformation then results in images that are free of artifacts. This method is shown schematically in FIG. 2. In the Fourier plane (11), the higher harmonics of the grating structure (3) are designated by (12), the zero point is designated by (13) and corresponds to the DC component of the illumination, i.e., a uniform, unstructured illumination. By introducing bandpass filters corresponding to the harmonics (12) into the beam path, these areas do not contribute to the imaging and are therefore not registered by the digital camera.

With respect to fluorescing objects, there is another reason for the occurrence of stripe artifacts, namely, fluorescence bleaching (photobleaching, fluorescence fading). In this case, the imaging of the structure (e.g., of the grating) in the object results in regions of differing degrees of bleaching of the fluorescence and therefore, finally, in stripe artifacts in every image recorded subsequently. The frequency components of the artifacts in the spectrum of an image of this type are particularly strong in the fundamental frequency of the projected structure. By removing the spatial frequency components of the projected structure in the Fourier-transformed image by means of corresponding bandpass filters and subsequent inverse transformation, an artifact-free image can also be generated in this case in principle.

Figure 3:
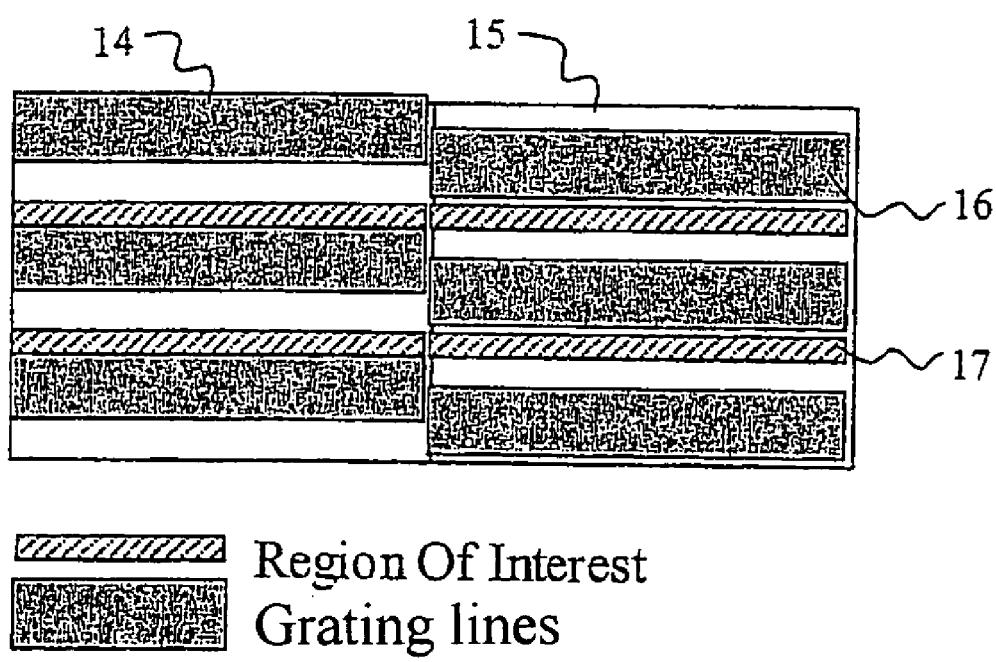
FIG. 3 is a schematic view of the position of the images of the periodic structure.

Prevention of these artifacts occurring in fluorescence illumination can also be achieved by determining and making use of the bleaching characteristics of fluorescing objects in the sequential recording of images of the same object. In this case, the illumination results in bleaching of the object at the illuminated points for every image recording. Apart from the illumination intensity, the degree of bleaching also depends on the photochemical and photophysical characteristics of the fluorescing object. By determining the fluorescence intensity of the object through integration of the intensities over all object points or selected object points (x, y), it is possible to rescale the image sequence after the images have been recorded. For this purpose, the intensities at the image points (x, y) are scaled to a maximum value either by means of an analog camera and analog-to-digital converter or a CCD camera using image information stored in a computer by determining the quotients of the fluorescence intensities of the images by pairs. In this way, the fluorescence loss due to fluorescence bleaching is taken into account. In addition, according to FIG. 3, regions of interest (ROI) can be defined which are equally illuminated in both image recordings and which subsequently fluoresce; the degree of the reduction in fluorescence in these regions is a measurement for the bleaching rate and can therefore be used for scaling the different recordings of the brightness distribution. These ROIs can be defined by the user by means of corresponding input devices or can be defined automatically (from the respective position of the imaged structure). In FIG. 3, the ratios in a first recording of the brightness distribution on the object is shown at (14) and the ratios in a second recording with changed phase position of the imaged structure (16) are shown at (15). The regions of interest (17) are advantageously defined in such a way that uniform illumination is carried out in both recordings.

The method according to the invention allows optical section images to be determined practically for any selected phase displacements $\phi_i$. In order to prevent errors, the phase displacements $\phi_i$ must be determined with high accuracy. This can be ensured in a simple manner by the calibration method described in the following, in which the influences of the entire system are taken into account.

For this purpose, a reference image (object with superimposed grating) is initially recorded and registered. A slight phase displacement of the grating to an initially unknown phase position of the grating is then carried out (this "displacement per control signal" is to be calibrated first) and a new image recording is made. The two images that are obtained are then compared by computation. Without limiting generality, this can be carried out by subtracting, summing, or in any other way that results in a merit function. The initial result is generally a striped image. The steps comprising displacement of the grating by a small amount, image recording, and comparison to the reference image are repeated until the merit function reaches the extreme value, that is, e.g., a difference image comprises only background noise or a sum image reaches maximum values. When the latter is accomplished, the calibration is finished and a control value obtained in this way can be kept in a storage medium so that it can be retrieved at a later time. Therefore, this value corresponds exactly to the displacement of the grating by a full period. Alternatively, it is also possible to assess a sum image for uniform brightness distribution (i.e., disappearance of stripe structure). In this case, this value corresponds to the displacement of the grating by half a period. This procedure is preferably carried out with a mirror as object. The described process can be carried out manually or automatically.

In the following, an alternative method for determining the influences of variations in lamp brightness, bleaching of the object in fluorescence illumination, and non-sinusoidal gratings is described with reference to FIG. 4.

For this purpose, the change in the illumination over time will be described by intensity-proportional scalar factors $\theta_i > 0$ which are taken into account in every successive recording (the dependency of the variables $g_i$, $o_i$, etc. on location (x, y) is no longer explicitly indicated in the following for the sake of simplicity):

$$g_i = \theta_i o_i \qquad (9)$$

The modeled observation $g_i$ is the product of the ideal, consistent phase image $o_i$. In order to describe a faulty system completely, only N−1 factors of $\theta_i$ need to be determined.

The bleaching of the object in fluorescence illumination depends on the effective radiation intensity over time. This varies spatially because of the projected grating and therefore must be handled in such a way that the grating function is taken into account. A simple description is possible when the bleaching is assumed to be a linear function of the illumination intensity:

$$k_i = (1 - d o_{i-1} k_{i-1}) \prod_{j=0}^{i-1} k_j, \ i \geq 1, \text{ where } k_0 = 1 \qquad (10)$$

The vector $0 < k_i \leq 1$ comprising spatially varying factors describes the attenuation as a function of the shape of the irradiation intensity and a selectable quantity $1 > d \geq 0$ for the bleaching when multiplied component-wise by the observations $o_i$ that have not yet undergone bleaching:

$$g_i = o_i k_i \qquad (11)$$

It follows from (10) that every observation is always multiplied by the factors of all preceding phase recordings; the latter are already bleached in part and overlap with the instantaneous phase. Alternatively, ki can also be described exponentially, i.e., corresponding to the fluorescence decay curve of a particular fluorophore.

Non-sinusoidal grating shapes cause stripe artifacts particularly at integral multiples of the grating frequency. With exact knowledge of frequency, phase position and curve shape of the grating in the individual recordings, it is possible to generate a sinusoidal shape. A correction vector $I_{Corr}$, similar to (10), but in this case along the grating periodicity, is considered in (12).

$$I_{Corr} = \frac{f_{\sin}}{f_{grating} + s} \quad (12)$$

The simulation of the observed grating function is characterized by $f_{grating}$. An ideally sinusoidal intensity curve is expressed by $f_{\sin}$. The constant s in the denominator should take over the division by very small values of $f_{grating}$. The simulation of the observed grating function can be carried out in different ways. A simple possibility for approximation is provided, e.g., through the use of a Fourier series for the trapezoid function.

$$f_{grating}(x; b) = \frac{1}{2} + \frac{2}{b\pi} \sum_{i=1}^{M} \frac{\sin(2bi - b)}{(2i-1)^2} \sin(2xi - x) \quad (13)$$

The edge steepness of the trapezoid transitions can be varied by b, x is the spatial coordinate, and M is the quantity of Fourier coefficients used. Alternatively, more exact models can also be used. They require convolution of the true grating function with a lateral component of the PSF of the microscope. A phase-synchronous synthesizing of the correction vector $I_{Corr}$ is crucial. When this is ensured, a corrected result for the observation can be achieved similar to (11) by a simple component-wise multiplication.

$$g_{iCorr} = g_i I_{iCorr} \quad (14)$$

The corrected phase images are now obtained from:

$$I_i = o_i = \frac{g_i I_{iCorr}}{k_i \theta_i}, \text{ where } \theta_i > 0 \cap k_i > 0 \quad (15)$$

By inserting (15) in Equations (3) or (8), a general formula is obtained for reconstruction which, moreover, contains the parameters $\theta_i$, d and b.

The stated problem can be solved, for example, by converting to an extremal problem. The parameters $\theta_i$, d and b can be determined with the aid of numeric optimization using a merit function.

$$M(\theta_i; d; b) = \alpha_0 |F\{\vec{a}\}_0|^2 + \alpha_i |F\{\vec{a}\}_\omega|^2 + \alpha_2 |F\{\vec{a}\}_{2\omega}|^2 + \ldots$$
$$\ldots + \alpha_n |F\{\vec{a}\}_{n\omega}|^2 \to \min \quad (16)$$

In this case, $F\{\vec{a}\}_\omega$ is a component of the Fourier transformation of the resultant vector $\vec{a}$, from Equation (5). Functional transformations other than the Fourier transformation are also suitable in this connection.

The merit function (Equation (16)) is mentioned here only by way of example. Other merit functions are also applicable. The aim is to vary $\theta_i$, d and b in such a way that (16) is minimized. Many methods are available for this purpose which are by no means limited to gradient methods or line-search methods. Further, every transformation coefficient is weighted by a coefficient $\alpha_i$. Accordingly, the algorithm can be adapted to different signal-to-noise ratios or preferred frequencies. An advantageous value in this respect for weighting the DC component is given by the following equation:

$$\alpha_0 \propto \frac{|F\{\vec{a}\}_1|^2 + |F\{\vec{a}\}_2|^2 + \ldots + |F\{\vec{a}\}_n|^2}{|F\{\vec{a}\}_0|^2} \quad (17)$$

Figure 4:
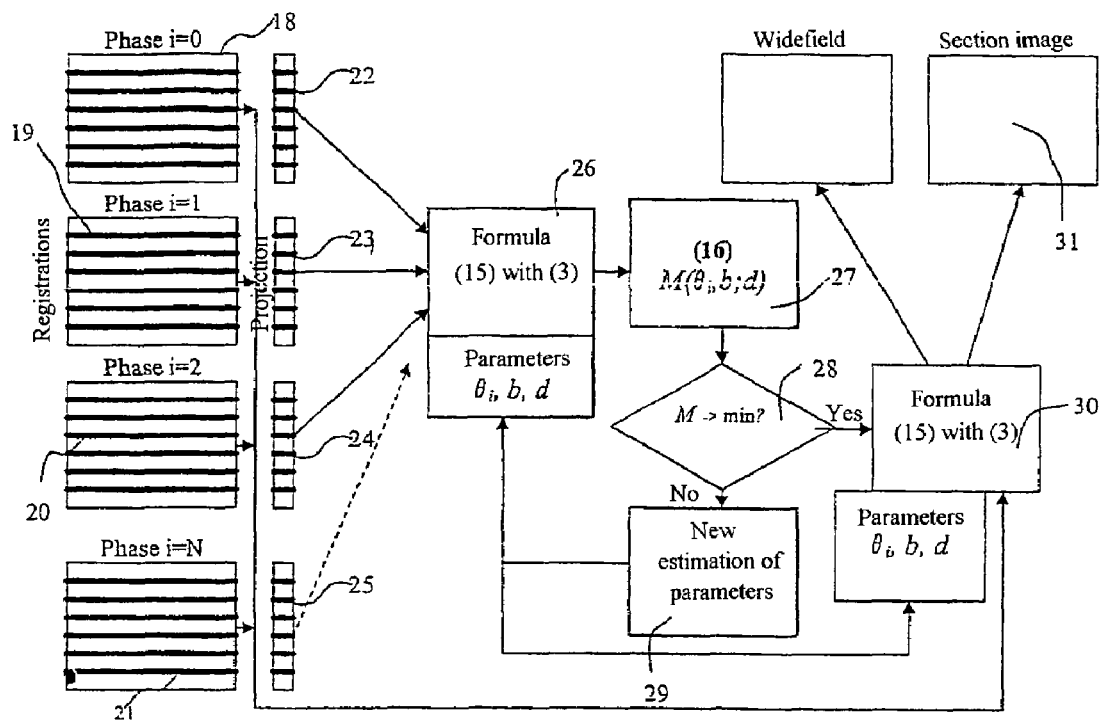
FIG. 4 shows a flowchart for determining correction values through linear optimization.

The general operation of the correction apparatus described herein is illustrated by the schematic flowchart in FIG. 4. The use of projections is advantageous for efficient determination of parameters $\theta_i$, d and b. However, the determination of parameters is not limited to this one-dimensional case, but functions in the plane in an analogous manner.

With a fixed focus position of the camera, at least three brightness distributions (18), (19), (20), and possibly more (21), are registered in different phase positions i=1, 2, 3 . . . , N of the grating structure imaged on the object. These two-dimensional brightness distributions are converted, respectively, to a one-dimensional distribution (22), (23), (24), and possibly (25), by means of projection. With initial values for the parameters $\theta_i$, d and b, corrected phase images are calculated according to formula (15) and a first image of the optical section is calculated (26) therefrom by means of the formulation from formula (3). The initial values of parameters $\theta_i$, d and b can be entered by the user or also estimated automatically. Known minimizing or maximizing tools of a merit function can be used for this estimation (e.g., Simplex, Marquardt, or the like). The merit function according to formula (16) is determined from this result in (27) and a test is made in (28) to determine whether or not a minimum has been reached. If this minimum has not yet been reached, a new estimation of the parameters $\theta_i$, d and b is carried out (29) and continued with (26). When the minimum of the merit function has been reached, i.e., the value of parameters $\theta_i$, d and b can be increased again by further variation of parameters $\theta_i$, d and b, the optimal parameters are determined and the optical section image is determined in (30) by means of formulas (15), (3) and (8) and outputted in (31). Subsequently, the focus position can be changed and another optical section image can be determined, and so on, by means of the described method. By means of this scanning of the object in z-direction, a z-stack of section images and, accordingly, a three-dimensional representation of the object can be generated.

Another approach for taking into account bleaching effects in the object in fluorescence illumination is based on determination of a local correction function. For this purpose, a correction function $\kappa_i(x)$ is assumed:

$$\kappa_i(x) = \frac{\int_{x-\tau/2}^{x+\tau/2} g_1(\xi) d\xi}{\int_{x-\tau/2}^{x+\tau/2} g_i(\xi) d\xi}, \quad (18)$$

whose local value is formed by integration over the grating period $\tau = 2\pi/\omega$. The formulation of this function can also take into account the dependency on y, although this is omitted in the present case for the sake of simplicity. Using a spatially variable bleaching function $\theta_i(x)$ and by suitable conversions with the approximation (see also formulas (1) and (9) $g_i(x)=\theta_i(x)[1+m\cos(\omega x+\phi_i)]$, it can be shown by the following equation $$\kappa_i(x) = \frac{\int_{x-\tau/2}^{x+\tau/2} I_0(\xi)d\xi + m\int_{x-\tau/2}^{x+\tau/2} I_0(\xi)\cos(\omega\xi+\varphi_1)d\xi}{\int_{x-\tau/2}^{x+\tau/2} \theta_i(\xi)I_0(\xi)d\xi + m\int_{x-\tau/2}^{x+\tau/2} \theta_i(\xi)I_0(\xi)\cos(\omega\xi+\varphi_1)d\xi}$$

that this correction function is proportional to $1/\theta_i(x)$ with uniform bleaching function.

It has proven advantageous to average over more than one grating period. Further, it has been shown that this correction function tends to spike in the neighborhood of edges in the bleaching function and can therefore generate additional errors in the results. In order to remedy this, it has proven successful to detect the occurrence of spiking by comparing to a mean value and to use the global value $1/\theta_i$ previously determined from formulas (9) and (16) at these points instead of the falsified value. The corresponding formula is then given by $$\kappa_i(x) = \begin{cases} \kappa_i(x) \text{ for } \left|\kappa_i(x) - \int_{x-\tau}^{x+\tau}\kappa_i(\xi)d\xi\right| < \varepsilon \\ 1/\theta_i \text{ otherwise} \end{cases} \quad (19)$$

For this purpose, the threshold $\varepsilon$ is advantageously set as a percentage of the variation of the local variability of the correction function within the image, e.g., 5%. Instead of $1/\theta_i$, interpolated values of $\kappa_i(x)$ which were calculated below the threshold in the two-dimensional space can be used outside the threshold.

This method accordingly takes into account bleaching phenomena which vary in a spatially-dependent manner, e.g., due to different fluorophores or varying characteristics thereof.

The realization of the invention is not limited to the embodiment examples shown herein. Further developments by persons skilled in the art or other approaches for taking into account the brightness variations of the light source or of the bleaching of the object in fluorescence illumination remain within the field of the invention.

While the foregoing description and drawings represent the present invention, it will be obvious to those skilled in the art that various changes may be made therein without departing from the true spirit and scope of the present invention.

The invention claimed is:

1. A method for improving the depth discrimination of optical systems comprising the steps of:
    a) illuminating an object with a periodic structure;
    b) registering a resulting brightness distribution;
    c) creating displacement of a phase position of the periodic structure;
    d) repeating steps a) to c) until at least three brightness distributions have been registered;
    e) calculating the registered brightness distributions to obtain an object brightness distribution;
    f) registering the displacements of the phase positions from c);
    g) detecting brightness variations of the illumination;
    h) determining bleaching phenomena of the object in fluorescence illumination; and
    i) carrying out calculation taking into account the results obtained in steps f) to h).

2. The method for improving the depth discrimination of optical systems according to claim 1, wherein the bleaching phenomena of the object in fluorescence illumination are determined in that regions of identical illumination intensity are determined from preferably successively registered brightness distributions and these regions are compared to one another with respect to brightness.

3. The method for improving the depth discrimination of optical systems according to claim 2, wherein a scaling factor is carried out by taking the quotients of the registered brightnesses of the regions of identical illumination intensity and the registered brightness distributions are scaled using this scaling factor.

4. The method for improving the depth discrimination of optical systems according to claim 1, wherein the determination of the object brightness distribution m(x, y) is carried out by the equation $$m(x, y) = \frac{\sqrt{a_1^2(x, y) + a_2^2(x, y)}}{a_0(x, y)},$$

wherein the vector $$\vec{a} = \begin{pmatrix} a_0(x, y) \\ a_1(x, y) \\ a_2(x, y) \end{pmatrix}$$

is determined by solving a system of equations from the linking of the registered brightness distributions $I_i(x, y, \phi_i)$ to the registered phase displacements $\phi_i$, where i represents the quantity of registrations of the brightness distribution.

5. The method for improving the depth discrimination of optical systems according to claim 3, wherein the equation system links the scaled brightness distributions to the registered phase displacements.

6. The method for improving the depth discrimination of optical systems according to claim 1, wherein a calibration of the displacements of the phase position is carried out, wherein a) an object, which is preferably a mirror surface, is illuminated by a periodic structure, b) a first brightness distribution is registered, c) the phase position of the periodic structure is changed by a small, definite amount which is registered, d) a second brightness distribution is registered, e) the difference between the two brightness distributions is determined and assessed with respect to stripe distribution, f) steps c) to e) are repeated until the valuing of the difference between the first brightness distribution and the subsequent brightness distribution results in an extremum; and g) the value of the phase position of the periodic structure found in this way is registered.

7. The method for improving the depth discrimination of optical systems according to claim 1, wherein errors resulting from non-sinusoidal distribution of the illumination of the object are corrected.

8. The method for improving the depth discrimination of optical systems according to claim 7, wherein higher harmonics of the fundamental frequency of the periodic structure are filtered out of the brightness distribution by means of bandpass filters.

9. The method for improving the depth discrimination of optical systems according to claim 1, wherein the registered brightness distributions are calculated by taking into account correction values, preferably for taking into account variations in brightness of the illumination, bleaching of the object in fluorescence illumination, and non-sinusoidal distribution of the illumination of the object, which are determined by linear optimization.

10. The method for improving the depth discrimination of optical systems according to claim 9, wherein the linear optimization is applied to a merit function of the following form:

$$M(\theta_i; d; b) = \alpha_0 |F\{\vec{a}\}_0|^2 + \alpha_i |F\{\vec{a}\}_\omega|^2 + \alpha_2 |F\{\vec{a}\}_{2\omega}|^2 + \ldots + \alpha_n |F\{\vec{a}\}_{n\omega}|^2 \to \min,$$

where $F\{a\}$ is a functional transform of vector a, $\theta_i$ are scalar factors for characterizing the variation in brightness of the illumination, d is a measurement for the bleaching of the object in fluorescence illumination, b is a factor for characterizing the non-sinusoidal distribution of the illumination of the object, and $\alpha_i$ are weighting coefficients for adapting to the recording conditions, preferably with respect to different signal-to-noise distances or preferred frequencies.

11. The method for improving the depth discrimination of optical systems according to claim 1, wherein bleaching phenomena of the object in fluorescence illumination are determined by determining a local correction function from preferably successive brightness registrations.

12. The method for improving the depth discrimination of optical systems according to claim 11, wherein this correction function is determined by averaging over at least one period of the periodic illumination structure.

13. The method for improving the depth discrimination of optical systems according to claim 11, wherein spiking of the calculated local correction function occurring in the neighborhood of edges of the bleaching function which are contained in the object is prevented by substituting an estimated value.

* * * * *